(12) United States Patent
Andon et al.

(10) Patent No.: US 12,541,763 B2
(45) Date of Patent: *Feb. 3, 2026

(54) MULTI-LAYER DIGITAL ASSET ARCHITECTURE FOR VIRTUAL AND MIXED REALITY ENVIRONMENTS

(71) Applicant: NIKE, Inc., Beaverton, OR (US)

(72) Inventors: Christopher Andon, Portland, OR (US); Hien Tommy Pham, Beaverton, OR (US); David S. Nay, Novi, MI (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/823,378

(22) Filed: Sep. 3, 2024

(65) Prior Publication Data

US 2024/0420138 A1 Dec. 19, 2024

Related U.S. Application Data

(63) Continuation of application No. 18/314,098, filed on May 8, 2023, now Pat. No. 12,093,953, which is a
(Continued)

(51) Int. Cl.
*G06Q 20/40* (2012.01)
*G06Q 20/38* (2012.01)
(Continued)

(52) U.S. Cl.
CPC ........ *G06Q 20/401* (2013.01); *G06Q 20/3825* (2013.01); *G06Q 30/0277* (2013.01);
(Continued)

(58) Field of Classification Search
CPC ............. G06Q 20/401; G06Q 20/3825; G06Q 20/223; G06Q 20/065; G06Q 2220/00;
(Continued)

(56) References Cited

U.S. PATENT DOCUMENTS 11,182,467 B1 * 11/2021 Medina .................. G06F 3/147
2019/0080389 A1 3/2019 Ottaifa
(Continued)

FOREIGN PATENT DOCUMENTS

JP 2009210934 A 9/2009
JP 2013210881 A 10/2013
(Continued)

OTHER PUBLICATIONS

Li et al. ("NFT Content Data Placement Strategy in P2P Storage Network for Permission Blockchain", 2021 IEEE 27th International Conference on Parallel and Distributed Systems (ICPADS), Apr. 30, 2022, pp. 90-97) (Year: 2022).*

(Continued)

*Primary Examiner* — James D Nigh

(74) *Attorney, Agent, or Firm* — Quinn IP Law

(57) ABSTRACT

A method for dynamically modifying a multi-layer digital asset in a digital environment includes retrieving, from a digital blockchain ledger, data associated with a primary non-fungible token (NFT) representing a primary digital asset; retrieving, from the digital blockchain ledger, data associated with a sub-asset NFT; monitoring a location of a user; determining that the user has crossed a predefined geofence boundary; in response to determining that the user has crossed the predefined geofence boundary, modifying the primary digital asset by incorporating visual elements from the sub-asset NFT; and displaying the modified primary digital asset within the digital environment.

16 Claims, 1 Drawing Sheet

Related U.S. Application Data continuation of application No. 17/967,851, filed on Oct. 17, 2022, now Pat. No. 11,682,015, which is a continuation of application No. 17/701,237, filed on Mar. 22, 2022, now Pat. No. 11,475,449.

(60) Provisional application No. 63/164,271, filed on Mar. 22, 2021.

(51) Int. Cl.
*G06Q 30/0241* (2023.01)
*G06T 11/00* (2006.01)
*G06T 11/60* (2006.01)
*G06Q 20/06* (2012.01)
*G06Q 30/06* (2023.01)
*G06Q 30/0601* (2023.01)
*H04L 9/00* (2022.01)

(52) U.S. Cl.
CPC ............ *G06T 11/001* (2013.01); *G06T 11/60* (2013.01); *G06Q 2220/00* (2013.01)

(58) Field of Classification Search
CPC ............... G06Q 30/0277; G06Q 30/06; G06Q 30/0643; G06T 11/001; G06T 11/60; H04L 9/50

USPC .......................................................... 705/65
See application file for complete search history.

(56) References Cited

U.S. PATENT DOCUMENTS

2020/0184041 A1* 6/2020 Andon ..................... G06F 21/16
2020/0273048 A1* 8/2020 Andon ..................... G06Q 10/02

FOREIGN PATENT DOCUMENTS

KR      20190026742 A     3/2019
KR      20200032090 A     3/2020

OTHER PUBLICATIONS

Goyal et al. ("Transactions Process in Advanced Applications on Ethereum Blockchain Network", 2020 5th International Conference on Recent Trends on Electronics, Information, Communication & Technology (RTEICT-2020), Nov. 12 and 13, 2020, pp. 275-281) (Year: 2020).*

ERC721 (Open Zeppelin docs, retrieved from The Wayback Machine—https://web.archive.org/web/20210310163109/https://docs.openzeppelin.com/contracts/4.x/erc721, scraped on Mar. 10, 2021, 4 pages) (Year: 2021).*

* cited by examiner

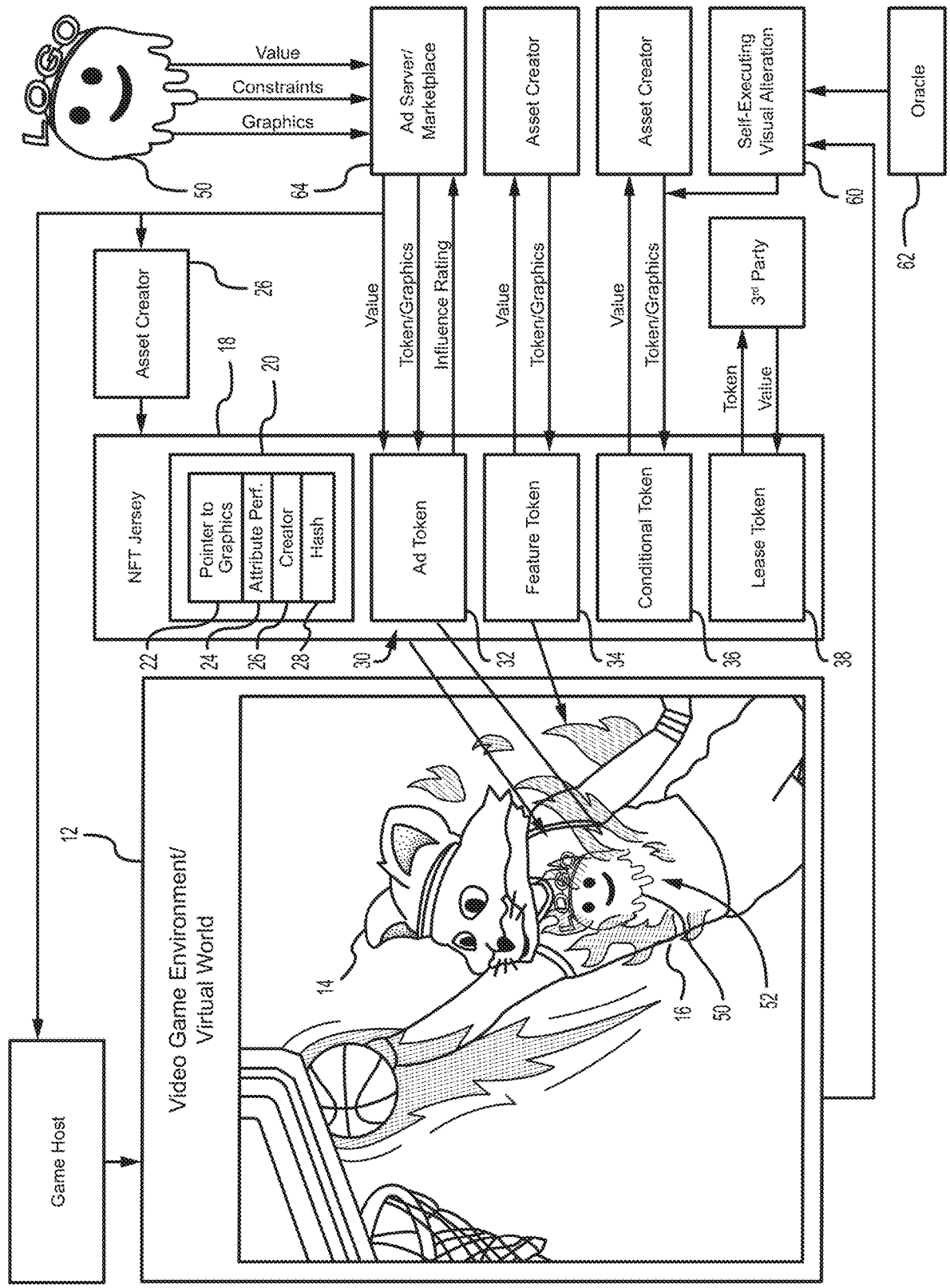

MULTI-LAYER DIGITAL ASSET ARCHITECTURE FOR VIRTUAL AND MIXED REALITY ENVIRONMENTS

CROSS REFERENCE TO RELATED APPLICATIONS

The present application is a continuation of U.S. patent application Ser. No. 18/314,098, which is published as US 2023/0274276, which is a continuation of U.S. patent application Ser. No. 17/967,851, now issued as U.S. Pat. No. 11,682,015, which is a continuation of U.S. patent application Ser. No. 17/701,237, now issued as U.S. Pat. No. 11,475,449, which claims the benefit of priority to U.S. Provisional Patent No. 63/164,271, filed 22 Mar. 2021. Each of the above mentioned references are incorporated by reference in their entirety and for all that they disclose.

TECHNICAL FIELD

The present disclosure generally relates to an architecture and method that allows a user to dynamically alter the appearance and/or behavior of a digital asset within a virtual or mixed reality environment.

BACKGROUND

A non-fungible token (NFT) is a non-interchangeable (i.e., non-fungible) record that is digitally stored and is capable of being sold or traded between different market participants. In many instances, an NFT can serve as a digital certificate of authenticity or proof of ownership in a corresponding digital or physical item. The records comprising the NFT are often stored in/on an immutable digital ledger, such as a blockchain-style ledger, which can be broken up across many different nodes or ledger-maintaining participants. Such blockchain ledgers will use some means of cryptology to encode at least a portion of the contents of the record, while also referencing the prior block (in the chain of blocks) to provide continuity.

NFTs typically include resident data, referred to as metadata, that is stored directly on the blockchain. Due to cost complexities associated with pushing large quantities of data through the transaction validation process, the metadata may often include a pointer or reference to off-chain data/digital files such as photos, graphics, videos, and/or audio that would be cost-prohibitive to store on-chain. When the NFT is displayed, such as on a user's social media account or in a user's digital wallet, an associated software program may review the metadata, and then digitally retrieve the associated photo from the referenced file repository for display.

SUMMARY

The present disclosure contemplates a blockchain-secured multi-layer digital asset that is formed via the nested reference of a first non-fungible cryptographic (NFT) token into a second NFT token. By layering or nesting one NFT into another, discrete features, advertisements, colors, functionality, appearances, accessories, and the like may be tokenized and transferrable separate from the more primary asset that incorporates the sub-asset. This technology may find particular use within video games, though may also be applicable to other areas such as art, digital collectables, augmented-reality/mixed-reality/virtual-reality environments, and the like.

In an embodiment of the present disclosure, a method of displaying or providing a multi-layer digital asset within a digital environment includes retrieving, from a digital blockchain ledger, data associated with a first, primary non fungible cryptographic token (NFT). The data comprises core asset information including a first pointer identifying a first retrieval location of a first digital graphics file and a reference to a second, sub-asset NFT. The first digital graphics file is representative of a primary digital asset, and the second, sub-asset NFT includes a second pointer that identifies a second retrieval location of a second digital graphics file. The method then includes retrieving, the first digital graphics file via the first retrieval location; retrieving, from the digital blockchain ledger, data associated with the second, sub-asset NFT, the data including the second pointer; and retrieving the second digital graphics file via the second retrieval location. An image from the second digital graphics file is then layered on the primary digital asset to form the multi-layer digital asset, which can then be displayed in a digital environment.

In some embodiments, the second, sub-asset NFT may be an advertising asset and the image from the second digital graphics file may include an advertising logo or indicia that can be overlaid onto the primary digital asset. This advertising logo or indicia may be obtained from a marketplace that includes a plurality of advertising logos or indicia that the user can operatively select. In some configurations, the multi-layer digital asset may be displayed in combination with a character avatar that is controlled within the digital environment by a user.

In an advertising context, the second NFT may further comprise a self-executing contract having digital software code that, when executed, automatically transfers an amount of value to an account associated with the user following the displaying of the multi-layer digital asset in the digital environment. Effectively this smart, self-executing contract may compensate the user for displaying the selected advertising logo or indicia. As such, the amount of value may be defined within the digital software code of the self-executing contract. In some configurations, the defined amount of value may be, at least partially a function of at least one attribute of the character avatar. This attribute may be, for example, a scope of influence, a gamer rating, participation in live events or tournaments, or the like. In some configurations, the smart contract may automatically transfer a second amount of value to an account associated with the creator of the primary digital asset, which may be identified within the core asset information of the first NFT. Further in some configurations an amount of value may be remitted or automatically transferred to an account associated with a creator of the digital environment. In one example, the primary digital asset may be an article of apparel or footwear that is operative to be worn by the character avatar.

In some embodiments, the sub-asset NFT may be operative to modify a color or appearance of the primary digital asset, such as by fully masking a portion of the primary digital asset to alter a color of the primary digital asset.

In some embodiments, the second, sub-asset NFT may be a feature asset. In such a configuration, the image from the second digital graphics file may be a partially transparent overlay and layering the image from the second digital graphics file on the primary digital asset may include overlaying the primary digital asset with the partially transparent overlay such that the primary digital asset is at least partially visible through the overlay. Examples of partially transparent overlays of this type may include flames, electricity, or dust clouds.

The second, sub-asset NFT may further include at least one performance attribute that is operative to modify at least one of a character attribute or a primary digital asset attribute such that the character or primary digital asset behaves in a modified manner within the digital environment. Example modified attributes may include power ups, increased performance abilities, speed, strength, leaping ability, accuracy, health, and the like. In some embodiments, the modification provided by the sub-asset NFT may deteriorate or diminish as a function of time or use of the sub-asset within the digital world or in connection with the character avatar.

In some embodiments, the display of the multi-layer digital asset may be conditioned upon some external event occurring. By "external" it is contemplated that the event is not specific solely to the primary NFT or secondary NFT, but rather involves some occurrence not strictly governed by the NFT itself. In such an instance, the method may include receiving from an external source, an indication that an event has occurred, and then displaying the multi-layer digital asset only after receipt of the indication that the event has occurred. In such an instance, the primary digital asset may still be displayed prior to the occurrence of the event. In some embodiments, the event is an event or occurrence occurring outside of the digital environment. For example, it may be another digital event, occurrence, sale, or piece of news. Alternatively, it may be a real-world event or occurrence. In some configurations, the indication of the occurrence of the event may be received from a blockchain oracle, such as may be implemented, for example, through the CHAINLINK blockchain protocol.

As noted, the second, sub-asset NFT may be fully alienable, separate from the primary digital asset. For example, the method may include transferring or making a request to transfer the second NFT to a second digital wallet or account, appending or making a request to append an indication of the transfer of the second NFT in the data of the first NFT; and removing the image from the multi-layer digital asset. Likewise, the second NFT may be leased out to the owner of the second digital wallet, in which case a lease token may be passed that governs use of the sub-asset, while ownership remains with the first party.

Additional features of the present disclosure are provided in the following description and figures.

BRIEF DESCRIPTION OF THE DRAWING

FIG. 1 is a schematic system diagram of a multi-layer digital asset architecture for virtual and mixed reality environments.

DETAILED DESCRIPTION

The present disclosure generally relates to an architecture and method that allows a user to dynamically alter the appearance and/or behavior of a digital asset within a virtual or mixed reality environment. This architecture regards certain discrete features, functionality, digital objects, and/or visual modifications as being distinct sub-assets that are each capable of being bought, sold, traded, or leased. In general, this technology may create a market for secondary features for a primary asset.

In a general sense, the present technology utilizes a layered approach to the construction of digital assets whereby a primary digital asset may be altered or affected by the one or more ancillary digital sub-assets. In one configuration, each asset and sub-asset may be represented by a non-fungible token that is registered to a database or distributed blockchain ledger and associated with an account of a particular user. Each asset and sub-asset may be fully alienable (subject to any contractual restrictions that may exist), and may be capable of being transferred, sold, or leased between an asset producer, a consumer, and/or one or more marketplace facilitators. US Patent Publication Nos. 2020/0184041 and 2020/0273048 describe various embodiments of what the present disclosure may regard as a primary digital asset and are incorporated by reference in their entirety and for all that they disclose (directly and/or by reference to other US patents or patent publications).

FIG. 1 schematically illustrates one embodiment of the present architecture 10 within the context of a basketball video game 12. While this technology may be best explained within the context of video games, it may also be used in other contexts such as augmented reality experiences, virtual reality experiences, digital lands and metaverses, digital product advertising, and digital artwork or collectables.

As generally shown in FIG. 1, within the context of the basketball video game 12, a user may control a player/character avatar 14 via a connected gaming console, mobile computing device (e.g., smartphone or tablet), or computer (not shown). Through a marketplace, event, giveaway, connected retail purchase, or the like, the user may have acquired a particular jersey 16 that the player 14 may wear during game play. For the purpose of this example, the jersey 16 may be regarded as a "primary digital asset." It is owned by the user and may be represented by a non-fungible cryptographic token (NFT) 18 that is registered to an account or digital wallet associated with the user. The NFT representing the jersey may contain certain core asset information 20, such as a pointer or reference 22 to the location of one or more associated graphics files; associated performance information 24, the identity or digital wallet address of the creator 26, and/or a hash of the prior cryptographic block 28. The performance information 24 may generally identify how the asset behaves within the environment and/or how it may affect or alter characteristics of the user's player/avatar 14 when worn (e.g., increased speed, jumping ability, or endurance).

In addition to the core asset information 20, the NFT 18 may be capable of containing or otherwise referring to one or more sub-assets 30 that, in some embodiments, may each be separately tokenized and recorded to a distributed blockchain ledger. As generally illustrated in FIG. 1, examples of sub-assets 30 that may be tokenized and used with the primary asset may include advertisement assets 32, feature assets 34, and/or conditional assets 36. For each of these assets, the primary digital asset may serve as the canvas or base layer upon which the sub-assets 30 operate or are displayed. Said another way, in this example, these sub assets may have little or no functional utility absent a primary digital asset to modify or embellish. Further, as will be described below, the NFT 18 may also include a lease token/sub-asset 38 that may be utilized when transferring use of the primary digital asset to a third party 40 for a limited duration.

So, to quickly summarize, a primary digital asset may be any item, avatar, avatar "skin", article of apparel, article of footwear, weapon, sporting equipment, or other digitally represented asset within a video game environment or virtual world (in FIG. 1, the primary digital asset is a basketball jersey 16). While the primary digital asset may have its existence within the virtual world, its unique existence may be individually secured to a distributed blockchain ledger in the form of an NFT 18. This NFT 18 can then be associated with a digital wallet belonging to, or otherwise accessible by the owner of the asset.

During the course of the primary digital asset's life or existence, the asset may be capable of receiving various "upgrades," such as upgraded functionality, altered visual appearance, dynamic overlays, advertising indicia, and the like. Each "upgrade" may be separately represented as its own discrete asset that may also be secured to a distributed blockchain ledger as an NFT. In some embodiments, when these tokenized upgrades are "applied" to the primary digital asset, the NFT of the sub-asset/upgrade may be referenced within the NFT of the primary digital asset (e.g., via a pointer to the sub-asset NFT). In doing so, when the primary digital asset is imported into the video game/virtual world, the act of importing may also retrieve all associated sub-assets as well. By structuring the architecture in this manner, each sub-asset or upgrade may have its own unique characteristics that can be read into the primary digital asset without permanently altering the underlying primary digital asset itself. Likewise, the upgrades are subject to their own unique ownership and may be alienable/transferrable separate from the primary digital asset.

Referring again to the architecture 10 depicted in FIG. 1, in the context of a basketball video game, "upgrades" that may be applied to an NFT-backed jersey may include, for example: advertising logos/indicia that may be layered onto the jersey (advertising assets 32); embellishments, accessories, visual effects, performance enhancements, or the like that alter the look, feel, and/or performance of the jersey and/or underlying avatar (feature assets 34); and conditional features that induce a visual or performance change conditioned on either the occurrence of an external event or on a probabilistic outcome (conditional assets 36).

With continued reference to the basketball jersey example shown in FIG. 1, in this embodiment, the advertising asset 32 may comprise a logo 50 that is affixed on the outer visual surface of the jersey 16 (i.e., within the game 12). In one embodiment, the location and size of the logo 50 on the jersey 16 may be specified by the creator 26 of the jersey (i.e., to maintain some control over the look and feel of the final article) and may be specified in the primary asset NFT 18. For example, the NFT 18 may include a first ad token container representing a primary logo displayed in large-form on the center of the jersey 16, and a second ad token container representing a secondary logo displayed in a comparatively smaller form on a sleeve, shoulder, or other less prominent location. Each container may be operative to receive a corresponding advertising token that represents the contractual right to display an advertisement as prescribed by the container. In this embodiment, the advertising token may include a pointer to a graphics file (or ad server that may dynamically assign an advertising logo).

In some embodiments, the logo 50 may simply be a component of a broader advertising/sponsorship agreement that may be represented by the advertising token/asset 32. More specifically, possession/ownership of the advertising asset 32 may represent the contractual rights and obligations of a more traditional sports sponsorship. Once the terms and scope are agreed to, possession of the token may pass to the wallet or account of the user and may be referenced or contained by the primary NFT 18. In some embodiments, such terms may include an indication of the value owed to the user for display of the logo (and/or a mechanism to facilitate automatic transfer) and/or a specified term for the agreement. Further, in some embodiments, the token may include a mechanism to automatically remit a portion of the contract value to the primary digital asset creator and/or game host. In this sense, the advertising asset 32 may comprise a smart contract that automatically remits payment from an advertiser or advertising marketplace 51 to an account of the user following a certain level of exposure or number of impressions. In the context of open virtual worlds or online streaming of a gamer's play, the number of impressions may exceed an n of 1 as might have been typical in prior eras. After the conclusion of the agreement, the token may expire, be burned, destroyed, or otherwise deactivated without penalty.

Continuing with the basketball jersey example, in some embodiments, the feature asset 34 may be a visual overlay or functionality modification that augments how the jersey looks, appears, or influences the behavior of the avatar/player 14. Examples of features that may be utilized with a jersey asset may include a temporary colorway, a fire overlay 52, an electricity overlay, overlaid chains, a particular radiance or glow, and/or various surrounding features, such as dust clouds, bats, murder hornets, and the like. Further in some embodiments, the feature asset 34 may include ancillary features such as jet packs, rockets, armor, or other features that may have performance affecting qualities (e.g., higher jumping, faster running, greater strength when initiating contact with the opponent). It should be understood that this listing of possible features is exemplary and should not be strictly limiting.

In one embodiment, the feature asset 34 may comprise a separate, tokenized digital collectable that, when possessed by the user and/or referenced by the primary asset NFT, may alter the functionality or performance of the primary digital asset, the avatar, or even the surrounding virtual environment as may be perceived by others within the environment. For example, in one embodiment, a feature asset 34 may include a tokenized visual representation of an issued US patent related to a particular consumer product, such as basketball shoes. Possession of this token by a user may then provide unique abilities, skins, colorways, and/or performance characteristics to a similar pair of shoes when worn by the user's player/avatar. Likewise, possession of an NFT patent image related to, for example, a digital advertising and/or virtual environment architecture (e.g., such as the present application) may entitle the owner/possessor to unique abilities or control over the environment for a limited or predefined duration.

In one embodiment, a method of providing an incentive to creators of technology may include minting an NFT digital collectable representative of an issued patent in the name of an inventor of the patent. This NFT digital patent certificate may have specific virtual reality or metaverse attributes as a feature asset 32 for any product within the metaverse that has a corresponding product in the real, physical world that is marked (directly or virtually) with the patent number represented by the NFT digital patent certificate (i.e., marked within the meaning of 35 USC 287). This NFT digital patent certificate may be fully alienable with any subsequent transfer for value (sale or lease) having a mechanism to transfer a percentage royalty to the original owner/inventor.

While NFT patent images are one embodiment of amazing collector items that could provide unique powers to the holder (e.g., power-ups, invincibility, unlimited ammo/weapons/strength/speed/etc.), in other embodiments, similar functional benefits may be had via collectible NFT trading cards (e.g., an NFT of a star pickleball athlete may provide a power-up if a user were playing as that athlete in a console-based digital pickleball game). Use of digital collectables as feature assets 34 may provide new metaverse-level utility to NFT collectables that are otherwise collected only for their exquisite beauty, rarity, or origin.

Because the feature asset 34 is distinctly tokenized and alienable, in some embodiments, the feature asset may be capable of being re-sold in a digital marketplace. The token representative of the feature asset may include, for example, a pointer to identify a source location for the graphics file, an indication of any timing attributes or dynamic functionality of the feature itself, and/or an indication of how the feature may impact any behavior or ability metrics of the avatar. In some embodiments, the token may further have a time or use-based performance degradation, whereby the abilities bestowed to the primary asset/avatar may degrade or diminish with the passage of time or use. As such, in a model where a user attempts to monetize the feature asset by leasing it out, the user may be required to balance any obtained return with an understanding of the asset's limited life or diminishing performance (i.e., similar to a rented automobile, a new car may command a higher rental fee than a 12-year-old high-mileage car with noticeable wear and tear). Sunsetting performance in this manner may further enhance collectors markets by reducing available inventory over time.

As noted above, the conditional asset 36 may be similar to the feature asset 34, though may have some element that is triggered or activated by an external occurrence or probability (note that it is referred to herein as a conditional asset, but it should more appropriately be regarded as a "conditional and/or probabilistic" asset). Examples of conditional assets 36 may include accessory packs that change the color of the jersey 16 when a particular basketball player in real life scores a certain number of points in a league game, gets named as an all-star, wins a league championship, or gets voted into the hall of fame. In another example the jersey may be re-skinned or ordained with particular indicia if the user achieves a particular number of gamer points across multiple games/platforms or achieves a particular regional, national, or worldwide player rank. In either case, the trigger comes from a source outside of the immediate game environment 12. For example, in one embodiment, a self-executing smart contract or condition evaluating logic 60 may receive input from a data repository, internet search, trusted source, blockchain oracle 62, the game 12, and/or some other third-party reference. The smart contract/logic 60 may evaluate one or more predetermined conditionals, and if the appropriate condition is met, the contract/logic 60 may initiate a modification in the sub-asset token (or visual representation thereof) to reflect the visual or performance modification.

In some embodiments, the conditional event may include a user crossing a particular geofence boundary (in real life or within a virtual world). For example, a user's primary digital asset may be a t-shirt that is perceivable on the user's physical body when viewed using augmented reality glasses/devices. Upon purchasing a concert ticket, the user may receive a conditional asset feature pack that includes digital lighting effects that may be applied to the t-shirt. As a condition to the lighting effects, however, the user must be physically located within the concert venue (i.e., must have crossed a geofence boundary into the activated zone during a prescribed time). Upon exiting this zone, the effects may be deactivated. Note that in this example, the feature asset may be received following a verified retail transaction, much like is described in US 2020/0184041, which is incorporated by reference above.

In some instances, instead of being solely reliant on the binary occurrence of an external event, the conditional asset 34 may include some element of probabilistic chance. More specifically, such a probabilistic asset may include an asset that, when purchased/received, has an uncertain visual appearance or functional benefit, though has a probabilistic chance of having various forms (e.g., a 60% chance of a first form/color, a 30% chance of a second form/color, a 9% chance of a third form/color, and a 1% chance of a fourth form/color). Upon the occurrence of some triggering event, a random number generator or other probabilistic selection routine may determine the resultant form of the sub-asset. Examples of triggering events may include conditional external events, game-related events, receipt of the token by the user, or a user (or user's avatar) crossing some predefined geofence boundary. Continuing with the concert t-shirt example, upon entering the venue, some users may receive temporary lighting effects while others may receive concert t-shirt skins/appliques that may persist even after the concert or outside of the geofence. In some embodiments, once the form is selected, it may be written to the token to achieve a permanence.

While US 2020/0184041 discusses the use of genetic modifiers to the digital asset, the presently disclosed feature sub-assets and conditional sub-assets may be regarded as non-genetic modifiers. These sub-assets may effectively layer on top of the primary asset without any core or permanent modification to the primary asset itself. Even if the added layer fully masks a portion of the primary asset (e.g., by overlaying or over-skinning a new colorway onto the primary asset), destruction of the feature sub-asset/token would simply remove the mask and the visual appearance of the primary asset would revert back to its original state.

The architecture 10 shown in FIG. 1 may provide a user with greater control and flexibility over how to best utilize their digital assets within a virtual or mixed reality environment. Because each sub-asset is fully alienable, the present technology can also create or expand marketplaces for unused and/or secondhand sub-assets. In some embodiments, as noted above, each token may be capable of being loaned out to a third party for an agreed upon duration. Such a feature may permit users to create revenue streams off unused assets or sub-assets by offering them for lease on a digital marketplace. Examples of unused assets may include particular colorways for an article of apparel or footwear and/or redundant features (e.g., when a user has three separate jet packs for the jersey, each with a different look and functional benefit). Further, this leasing ability could create new enterprises within virtual worlds, such as a jet pack rental business (i.e., where the business acquires a plurality of jet pack feature assets 34, and then rents/leases them to end users for a predefined period of time to tour the virtual world in flight).

Similar to a digital marketplace for features, in some embodiments, the present architecture may include a digital marketplace 64 for advertisements. In doing so, a corporation who has a logo 50 may mint a plurality of NFTs, each containing a reference to a particular logo file. In some embodiments, in addition to simply supplying the logo, the company may also indicate how much it is willing to pay and/or may provide any constraints toward use (geographic, target audience, game, etc.). Once published to the marketplace, users may enter the marketplace and agree to certain "sponsorships" whereby the user would agree to wear a logo on the primary asset for a predetermined amount of time or impressions. Once a logo is selected, the minted token may pass to the user, and the user may begin receiving value for displaying the logo 50. Further, in some embodiments, the creator of the primary asset may receive a commission for having provided the vehicle to support the logo. Likewise, the game host may receive a commission for having provided the environment for the logo to be seen.

In some embodiments, this advertising model may create a sports-marketing game within the game. More particularly, the user may desire to maximize any potential income stream by selecting a logo from the marketplace that will provide the greatest earning potential. In one configuration, the marketplace may dynamically adjust prices based on the constraints set by the companies, the target market of each company, the total supply of available advertisements, the total demand for advertisements, and a user's scope of influence. For example, a company would be willing to pay a higher rate for placement on an individual within a target demographic/audience/region (in the physical world) than it would for a placement on someone outside that target demographic/audience/region—i.e., a regional restaurant chain would likely not pay as much to advertise in a remote country as it would in its local market.

In some embodiments, a user may be assigned a scope of influence rating that may affect the cost of advertising within the marketplace. More specifically, a user that has a greater scope of influence may command a higher advertising rate than a user with a comparatively lower scope of influence. The scope of influence rating may reflect one or both of in-game influence/visibility and out-of-game influence/visibility. In game factors that may be considered include, for example, game ranking, game points, tournament rankings, and team or clan rankings. Likewise, out-of-game factors may include performance or ranking across multiple games or platforms, a number of followers on one or more social media accounts, or an amount of recently created/streamed content (and associated views/likes). In this manner, much like professional athletics, the more a gamer succeeds in the game and/or in attracting followers outside of the game, the more advertisers would be willing to pay to have their logo associated with that individual.

While the prior disclosure has been made within the context of a basketball video game, it is similarly applicable to environmental advertising within a virtual or mixed reality digital environment. More specifically, instead of the primary asset being a basketball jersey, the primary asset may be a billboard or other digital signage. Similar to pricing an advertisement in the context of a basketball player's scope of influence, the advertisement on the billboard may be priced in terms of the billboard's scope of influence. This may be measured, for example, in terms of the number of impressions or views that the advertisement is expected to receive over a predetermined period of time.

In some embodiments, the virtual environment within which the advertisement is hosted may include an application layer that enables any tokenized asset to poll the quantity and nature of other tokenized assets within a given proximity. In some embodiments, one possible conditional feature may include a visual alteration or video display if a tokenized asset of a particular value or rarity is located within a predetermined proximity of the primary asset. In one embodiment where the primary asset is a billboard advertisement, the proximity of a specific tokenized asset or a tokenized asset having at least some predetermined rarity score may unlock a virtual storefront or virtual experience that may override the displayed advertisement.

In still another example, the present technology may be used in connection with digital artwork or collectables. For example, a digital collectable may include a conditional sub-asset token that alters a static or dynamic visual appearance based on the occurrence of an outside event. For example, an NFT based image of a greenscape may have a conditional sub-asset that inserts a dynamic image of a blooming corpse flower any time a known corpse flower blooms in real life (i.e., understanding that the blooming of a corpse flower in real life is a rare and often a documented event). In this example, the conditional corpse-flower sub-asset may be tokenized by its creator and minted in a predetermined quantity. Primary art owners may then acquire the corpse flower sub asset and incorporate it into art that they already own. Similarly, a creator may mint a sub asset of a rocket ship flying toward/past the moon which may be inserted into other digital collectables and may trigger, for example, when a corporate stock of exceptional interest rises in price by more than a predetermined amount or percentage.

It should be appreciated that the above-described technology may be capable of implementation in a variety of forms. While NFT technology is consistently referenced, the technology may be implemented through one or more public blockchains, private blockchains, and/or may incorporate one or more sidechains, smart contracts, databases, and the like.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and sub-combinations of the preceding elements and features.

Further aspects of the present technology are provided in the following clauses, which should be read in light of the preceding disclosure:

Clause 1: A method of displaying a multi-layer digital asset in a digital environment, the method comprising: retrieving, from a digital blockchain ledger, data associated with a first, primary non fungible cryptographic token (NFT), the data comprising: core asset information including: a first pointer identifying a first retrieval location of a first digital graphics file, wherein the first digital graphics file is representative of a primary digital asset; and a reference to a second, sub-asset NFT, wherein the second, sub-asset NFT includes a second pointer that identifies a second retrieval location of a second digital graphics file, retrieving, the first digital graphics file via the first retrieval location; retrieving, from the digital blockchain ledger, data associated with the second, sub-asset NFT, the data including the second pointer; retrieving the second digital graphics file via the second retrieval location; layering an image from the second digital graphics file on the primary digital asset to form the multi-layer digital asset; and displaying the multi-layer digital asset in a digital environment.

Clause 2: The method of clause 1, wherein the second, sub-asset NFT is an advertising asset and wherein the image from the second digital graphics file comprises an advertising logo or indicia.

Clause 3: The method of clause 2, wherein the second retrieval location comprises a marketplace having a plurality of advertising logos or indicia.

Clause 4: The method of any of clauses 2-3, wherein displaying the multi-layer digital asset comprises displaying the multi-layer digital asset in combination with a character avatar, wherein the character avatar is controlled within the digital environment by a user.

Clause 5: The method of clause 4, wherein the second NFT further comprises a self-executing contract, the self-contract comprising digital software code that when executed automatically transfers an amount of value to an account associated with the user following the displaying of the multi-layer digital asset in the digital environment.

Clause 6: The method of clause 5, wherein the amount of value is defined within the digital software code of the self-executing contract.

Clause 7: The method of clause 6, wherein the character avatar comprises a plurality of attributes; and wherein the amount of value is, in part, a function of at least one attribute of the plurality of attributes.

Clause 8: The method of any of clauses 5-7, wherein the amount of value is a first amount of value; wherein the core asset information of the first NFT further includes an identification of a creator of the primary digital asset; and wherein the digital software code, when executed, automatically transfers a second amount of value to an account associated with the creator of the primary digital asset.

Clause 9: The method of any of clauses 5-7, wherein the amount of value is a first amount of value; wherein the digital software code, when executed, automatically transfers a second amount of value to an account associated with a creator of the digital environment.

Clause 10: The method of any of clauses 4-9, wherein the primary digital asset is an article of apparel or footwear operative to be worn by the character avatar.

Clause 11: The method of clause 10, wherein the primary digital asset is a sports jersey.

Clause 12: The method of any of clauses 1-11, wherein layering the image from the second digital graphics file on the primary digital asset comprises fully masking a portion of the primary digital asset to alter a color of the primary digital asset.

Clause 13: The method of any of clauses 1-12, wherein the second, sub-asset NFT is a feature asset, and wherein the image from the second digital graphics file comprises a partially transparent overlay; and wherein layering the image from the second digital graphics file on the primary digital asset comprises overlaying the primary digital asset with the partially transparent overlay such that the primary digital asset is at least partially visible through the overlay.

Clause 14: The method of clause 13, wherein the partially transparent overlay comprises at least one of: flames; electricity; or dust clouds.

Clause 15: The method of any of clauses 1-14, wherein displaying the multi-layer digital asset comprises displaying the multi-layer digital asset in combination with a character avatar, wherein the character avatar is controlled within the digital environment by a user, the character avatar further comprising a plurality of character attributes operative to influence how the character avatar behaves or performs within the digital environment; wherein the second, sub-asset NFT is a feature asset and includes data comprising at least one performance attribute; and the method further comprising modifying at least one of the plurality of character attributes according to the at least one performance attribute of the second, sub-asset NFT.

Clause 16: The method of clause 15, wherein the modifying of the at least one of the plurality of character attributes diminishes as a function of an amount of time or use of the second, sub-asset NFT within the digital environment.

Clause 17: The method of any of clauses 15-16, wherein the second, sub-asset NFT comprises a third pointer that identifies a third retrieval location of a third digital graphics file; the method further comprising: retrieving the third digital graphics file from the third retrieval location; and displaying an image from the third digital graphics file within the digital environment.

Clause 18: The method of clause 17, wherein the image from the third digital graphics file comprises an image of a trading card or patent.

Clause 19: The method of any of clauses 1-18, further comprising: receiving from an external source, an indication that an event has occurred; and wherein displaying the multi-layer digital asset occurs only after receipt of the indication that the event has occurred.

Clause 20: The method of clause 19, wherein the event is an event or occurrence occurring outside of the digital environment.

Clause 21: The method of clause 20, wherein the event is a real-world event or occurrence.

Clause 22: The method of clause 21, wherein the external source is a blockchain oracle.

Clause 23: The method of any of clauses 19-22, wherein the event is a user crossing a geofence boundary.

Clause 24: The method of any of clauses 1-23, wherein the second NFT is held in a first digital wallet or account; the method further comprising: transferring or making a request to transfer the second NFT to a second digital wallet or account; appending or making a request to append an indication of the transfer of the second NFT in the data of the first NFT; and removing the image from the multi-layer digital asset.

Clause 25: The method of any of clauses 1-24, wherein the digital environment is an augmented reality or mixed reality environment.

The invention claimed is:

1. A method for dynamically modifying a multi-layer digital asset in a digital environment, comprising:
retrieving, from a digital blockchain ledger, data associated with a primary non-fungible token (NFT) representing a primary digital asset;
retrieving, from the digital blockchain ledger, data associated with a sub-asset NFT;
monitoring a location of a user;
determining that the user has crossed a predefined geofence boundary;
in response to determining that the user has crossed the predefined geofence boundary, modifying the primary digital asset by incorporating visual elements from the sub-asset NFT; and
displaying the modified primary digital asset within the digital environment.

2. The method of claim 1, wherein the digital environment is an augmented reality environment.

3. The method of claim 1, wherein the digital environment is a virtual reality environment.

4. The method of claim 1, wherein the primary digital asset is an article of virtual apparel or equipment associated with the user or an avatar of the user in the digital environment.

5. The method of claim 1, wherein the sub-asset NFT represents advertising indicia.

6. The method of claim 1, wherein the sub-asset NFT represents a visual effect to be applied to the primary digital asset.

7. The method of claim 6, wherein the visual effect comprises a partially transparent overlay.

8. The method of claim 1, wherein the predefined geofence boundary corresponds to a real-world location.

9. The method of claim 1, wherein the predefined geofence boundary corresponds to a virtual location within the digital environment.

10. The method of claim 1, further comprising:
monitoring the user's location relative to the predefined geofence boundary; and
reverting the primary digital asset to its original state when the user crosses the predefined geofence boundary to exit the geofenced area.

11. The method of claim 1, wherein modifying the primary digital asset comprises altering performance characteristics of the primary digital asset within the digital environment.

12. The method of claim 1, further comprising:
receiving, from a blockchain oracle, verification that the user has crossed the predefined geofence boundary.

13. The method of claim 1, wherein the sub-asset NFT is selected from a marketplace of available sub-asset NFTs based on the location of the user.

14. A method for dynamically modifying multi-layer digital assets in a digital environment, comprising:
retrieving, from a digital blockchain ledger, data associated with a primary non-fungible token (NFT) representing a primary digital asset;
retrieving, from the digital blockchain ledger, data associated with multiple sub-asset NFTs;
receiving location data of a user;
determining, based on the location data, that the user has crossed a predefined geofence boundary;
selecting a sub-asset NFT from the multiple sub-asset NFTs based on a characteristic of the predefined geofence boundary and/or a characteristic of the user;
in response to determining that the user has crossed the predefined geofence boundary, modifying the primary digital asset by incorporating visual elements from the selected sub-asset NFT; and
displaying the modified primary digital asset within the digital environment.

15. The method of claim 14, further comprising:
receiving updated location data of the user;
determining, based on the updated location data, that the user has exited the predefined geofence boundary; and
reverting the primary digital asset to its original state in response to determining that the user has exited the predefined geofence boundary; and
wherein selecting the sub-asset NFT comprises:
analyzing metadata associated with each of the multiple sub-asset NFTs;
comparing the metadata with predefined criteria associated with the geofence boundary or the user; and
selecting the sub-asset NFT based on the comparison.

16. The method of claim 14, wherein the digital environment is an augmented reality environment, and wherein displaying the modified primary digital asset comprises:
receiving real-world image data from a device associated with the user;
combining the modified primary digital asset with the real-world image data to generate augmented reality display data; and
transmitting the augmented reality display data to the device associated with the user.

* * * * *